US008395702B2

(12) United States Patent
Sontag et al.

(10) Patent No.: US 8,395,702 B2
(45) Date of Patent: Mar. 12, 2013

(54) SYSTEM FOR TRANSMITTING AND RECEIVING VIDEO DIGITAL SIGNALS FOR LINKS OF THE "LVDS" TYPE

(75) Inventors: Yves Sontag, Bordeaux (FR); Michael Guffroy, Martignas sur Jalles (FR)

(73) Assignee: Thales, Neuilly sur Seine (FR)

( * ) Notice: Subject to any disclaimer, the term of this patent is extended or adjusted under 35 U.S.C. 154(b) by 42 days.

(21) Appl. No.: 13/212,056

(22) Filed: Aug. 17, 2011

(65) Prior Publication Data

US 2012/0050611 A1 Mar. 1, 2012

(30) Foreign Application Priority Data

Aug. 24, 2010 (FR) ..................................... 10 03435

(51) Int. Cl.
*H04N 7/00* (2011.01)

(52) U.S. Cl. ....................................................... 348/488

(58) Field of Classification Search .................. 348/488, 348/489, 490, 491–494, 554–558; 345/99, 345/211; 710/7, 20, 21
See application file for complete search history.

(56) References Cited

U.S. PATENT DOCUMENTS 6,326,958 B1 * 12/2001 Gorny et al. .................. 345/204
6,487,614 B2 * 11/2002 Nobutani et al. ............... 710/20
7,664,015 B2 * 2/2010 Price et al. .................... 370/229
7,847,779 B2 * 12/2010 Liao ................................ 345/99
8,090,971 B2 * 1/2012 Sarmento ...................... 713/400
2002/0140662 A1 10/2002 Igarashi
2004/0042577 A1 3/2004 Sumiyoshi et al.
2004/0196279 A1 * 10/2004 Kim et al. ..................... 345/211
2007/0229434 A1 10/2007 Liao
2010/0289963 A1 11/2010 Lefort et al.

* cited by examiner

*Primary Examiner* — Paulos M Natnael
(74) *Attorney, Agent, or Firm* — Baker Hostetler LLP

(57) ABSTRACT

Systems for transmitting and receiving signals of video digital images for links of the "LVDS" type comprise a transmit module, a transmission link and a receive module. The "RGB" video signal comprises the colour and synchronization signals and a clock signal. The "LVDS" video signal transmitted via the transmission link comprises several primary signals, the first primary signal dedicated to the clock signal, the second primary signal comprising the synchronization information, the other primary signals comprising only the colour encoding information. The function of the "LVDS" transmit module is to encode the "RGB" video signal into an "LVDS" video signal and the function of the receive module is to decode the "LVDS" signal into an "RGB" signal. The system comprises the following particular arrangements: the transmission system having a means making it possible to inlay a graphic recognition pattern in the "RGB" video signal; the receive means operating in oversampling and having a test means capable of identifying the synchronization information and the graphic recognition pattern.

6 Claims, 4 Drawing Sheets

SYSTEM FOR TRANSMITTING AND RECEIVING VIDEO DIGITAL SIGNALS FOR LINKS OF THE "LVDS" TYPE

CROSS-REFERENCE TO RELATED APPLICATION

This application claims priority to foreign French patent application No. FR 1003435, filed on Aug. 24, 2010, the disclosure of which is incorporated by reference in its entirety.

FIELD OF THE INVENTION

The field of the invention is that of digital links of the "LVDS" type, the acronym meaning "Low Voltage Differential Signalling". The invention relates more particularly to the system for transmitting and receiving transmitted signals and their encoding. The invention may apply to any field using "LVDS" interfaces to transmit video information. However, it is primarily designed for aeronautical applications.

BACKGROUND

These links are usually used for the transmission of images and have different names. The most widespread are: "FPD-LINK", "Camera-Link", "Channel-Link", "FLATLINK", etc. As an example, FIG. 1 represents a complete transmission system of the "LVDS" type. It comprises a transmission interface 1, the transmission line itself 2 and a receive interface 3. Typically, the transmission interface 1 and reception interface 3 comprise amplification means 10 and 30 and encoding modules 11 and 31. In the case of FIG. 1, the system is designed to transmit video signals of "RGB" type encoded on 3×6 bits. The link 2 comprises 4 pairs of twisted wires placed in parallel. The transmission interface 1 encodes the video signals (R, G, B) and the synchronization information SYNC and sends them over the first three pairs of link wires. It also transmits the clock signal CLK over the fourth pair. At the other end of the link 2, the reception interface 3 does the reverse job and, based on the signals received, decodes the video signal. If the video information is encoded on 3×8 bits, then the link 2 needs a fifth pair of twisted wires.

Originally, "LVDS" links were initially developed for links internal to a portable microcomputer, from the graphic component to the flat screen, and they are highly suited to this type of short-distance application. This type of link is highly developed and today they cost little and a large number of liquid crystal panels possess an "LVDS" interface. Also, many users are tempted to produce links that are not only intra-equipment but also inter-equipment using this technology. In the aeronautical field, it is possible to use it for certain items of avionic equipment, for example those performing the function called "Electronic Flight Bag" or "EFB" designed to replace the on-board manuals and documentation. The ARINC 828 standard which specifies the interface of these items of "EFB" equipment authorizes, inter alia, the use of "LVDS" links. This use is of value because the items of equipment based on a hardened card for portable computer have an "LVDS" video output from the outset.

On this type of "LVDS" link, the high-frequency clock is reconstituted by conventional reception means based on the pixel clock and is used directly to sample the channels called Rin0, Rin1 and Rin2 containing the video data as indicated in FIG. 2 where the phase locked loop 32 or "PLL" controls the "flip-flops" 33. This sampling principle is therefore extremely sensitive to the skew between the lines which is also called "inter-pair skew". When the link is more than a few meters long, depending on the features of the multiple-pair cable, transmission errors can occur due to the skew between the various channels which increases with length. It is, therefore, necessary for the skew between the channels to remain distinctly smaller than the "bit" period of the "LVDS" serial transmission which equals a seventh of the "pixel" period.

As an example, a video format of the "XGA" type transmitting images comprising 1024×768 pixels to the "SPWG" standard, meaning "Standard Panel Working Group", at the refresh frequency of 60 Hz has a "pixel" frequency of 56 MHz. Its serial transmission frequency is 7 times higher and consequently equals 392 MHz. A "bit" period or "UI" for "Unit Interval" therefore has a duration of approximately 2.5 ns. Consequently, the addition of all the causes of skew due, for example to the serializer/deserializer components called "SERDES", to the lengths of the tracks of the printed circuits, to the connecters and to the cables must not cause an overall error of more than 1.25 ns. However, the best multiple-pair cables, that is to say those that are specified for this usage, have a specification interpair skew of less than or equal to 50 ps/m which is already extreme for great lengths of cable of several tens of meters. For usage in harsh environments, like those of avionics for example, there are no such cables and the skew between pairs of cables is not controlled with the aeronautical cables available.

Also, the standard reception means of "LVDS" links can be reasonably used in avionics only for short or very short links using a specific harness.

In order to solve the problems of "LVDS" links, the company "Silicon Image" has developed a new standard called "TMDS" meaning "Transition Minimized Differential Signalling" adopted for the "DVI" and "HDMI" video standards. Video data in "TMDS" format are encoded by an 8 Bits-10 Bits encoder device which has the effect of:

- producing a code said to be "DC balanced", that is to say comprising practically as many "0" bits as "1" bits. This code makes it possible to dispense with the transmission of the continuous component and provides an improvement of the eye diagram;
- limiting the duration without transition called "run length", which allows the coupling of an analogue phase loop in order to find the bit phase on each of the channels independently;
- procuring special characters which make it possible to find the word phase called "word boundaries" and allows the transmission of video synchronization signals such as "Data Enable", "HSYNC" and "VSYNC".

With this standard, the tolerance of skew between the channels is no longer truly limited on principle. For the recent components called "PanelLink®" or "PanelBus™", the tolerance is a pixel clock period which is amply sufficient. Unfortunately the "TMDS" link is totally incompatible with the "LVDS" link, their respective interfaces not being able to communicate with one another. It is therefore not possible to improve a system by replacing "LVDS" links with "TMDS" links without compromising compatibility with the existing hardware. Another drawback of "TMDS" transmission is the increase in bandwidth that is necessary. The use of 10B encoding requires a transmission speed of 650 Mbaud for an image of the "XGA" type to the "VESA DMT" standard, meaning "Video Electronics Standards Association Discrete Monitor Timing". In the case of an "LVDS" transmission, the necessary speed is only 392 Mbaud for the same format to the "SPWG" standard. Therefore a wiring provided for an "LVDS" transmission cannot support a "TMDS" link.

SUMMARY OF THE INVENTION

The object of the system according to the invention is to provide in reception, just like a "TMDS" receiver, a tolerance to interpair skew of at least one pixel period, which is amply sufficient for the large majority of aeronautical applications without making major modifications to the "LVDS" transmission standard. This system consists of three main functions allowing:

- the retrieval of the bit phase (serial signal);
- the retrieval of the pixel phase (transmission word) on the line called "Rin2" which carries the video synchronization information;
- the retrieval of the pixel phase on the other two channels by virtue, in particular, of the decoding of a signal called a "post-it" signal inserted on transmission.

More precisely, the subject of the invention is a system for transmitting and receiving signals of video digital images of the "RGB" type for links of the "LVDS" type, a system comprising at least one transmit module, a transmission link and a receive module;

the "RGB" video signal comprising three colour signals corresponding to the colour coding of the pixels of the transmitted images, three synchronization signals and one clock signal;

the "LVDS" video signal transmitted via the transmission link comprising at least four primary signals, each primary signal being transmitted over a transmission cable which is dedicated thereto, the first primary signal "CLK" dedicated to the clock signal, the second primary signal "Rin2" comprising the synchronization information and at least the third and the fourth primary signal "Rin0" and "Rin1" comprising only the colour coding information;

the "LVDS" transmit module having the function of encoding the "RGB" video signal into an "LVDS" video signal and the receive module having the function of decoding the "LVDS" signal into an "RGB" signal;

characterized in that:

the transmission system comprises a means making it possible to inlay a graphic recognition pattern in the "RGB" video signal;

the receive means operate in oversampling, that is to say at a sampling frequency that is a whole multiple of the frequency of the clock signal;

the receive means comprise test means capable of identifying the synchronization information in the second "LVDS" primary signal and the graphic recognition pattern.

Advantageously, when the colour signals are encoded on 6 bits, the transmission link comprises 4 transmission cables and, when the colour signals are encoded on 8 bits, the transmission link comprises 5 transmission cables.

Advantageously, the graphic pattern is of the "post-it" type, that is to say corresponds to a portion of image, is always situated in the same location of the video image and is always superimposed on the initial portion of video image that it replaces. It is possible to limit its height to one line of the video image. The pattern is preferably aperiodic.

Advantageously, the sampling frequency is equal to 5 times the frequency of the clock signal.

BRIEF DESCRIPTION OF THE DRAWINGS

The invention will be better understood and other advantages will become evident on reading the following description which is given as a non-limiting example and by virtue of the appended figures amongst which.

DETAILED DESCRIPTION

Figure 1:
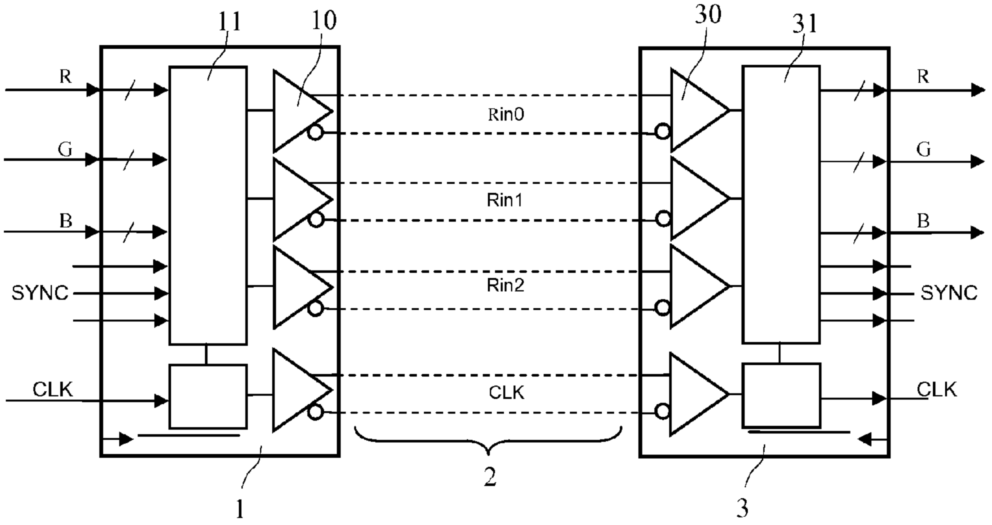
FIG. 1 represents the general principle of a system for transmitting and receiving signals of video digital images of the "RGB" type for links of the "LVDS" type.
Figure 2:
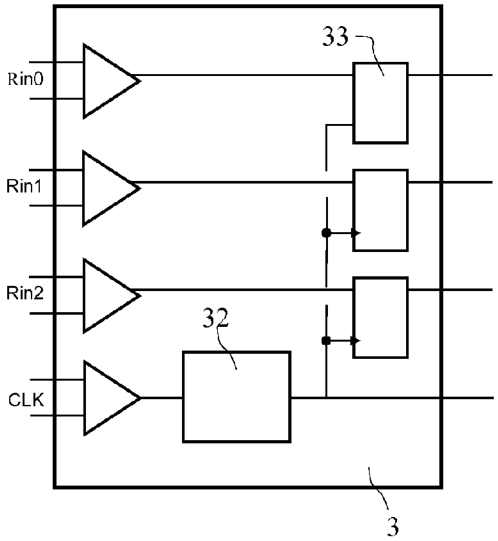
FIG. 2 represents the general block diagram of the means for receiving line or "LVDS" signals according to the prior art.
Figure 3:
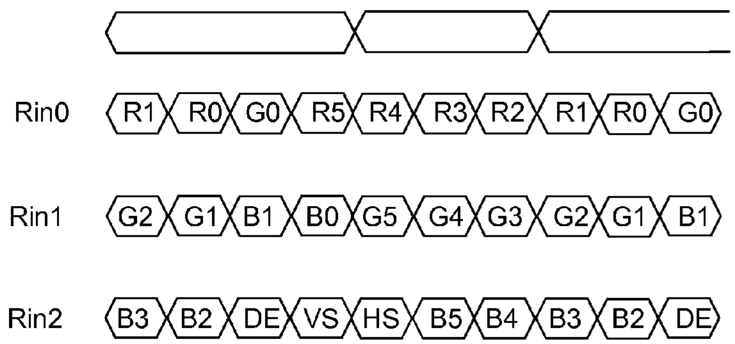
FIG. 3 represents the general content of the line or "LVDS" signals.

In the rest of the description, the definitions and the following terminology have been adopted:

the video signal, the subject of the transmission, comprises:

- three colour signals corresponding to the colour encoding of the pixels of the transmitted images. These pixels may be encoded either on 6 bits or on 8 bits. In the first case of an encoding on 6 bits, the bits corresponding to the "red" pixels are marked from R0 to R5, the bits corresponding to the "green" pixels are marked from G0 to G5, and the bits corresponding to the "blue" pixels are marked from B0 to B5,
- three synchronization signals marked DE meaning "Data Enable", VS meaning "Vertical Synchro" and HS meaning "Horizontal Synchro", these three signals each being encoded on one bit;
- a clock signal;

the link transmitting the "LVDS" video signal comprises four primary signals when the video signal is encoded on 6 bits and 5 primary signals when the signal is encoded on 8 bits, each primary signal being transmitted over a transmission cable which is dedicated thereto, each signal comprising a succession of 7-bit words placed in series. This link is shown in FIG. 3 in the case of video signals encoded on 6 bits according to the "SPWG" standard. The "LVDS" signals are then organized in the following manner:

- the first primary signal "CLK" dedicated to the clock signal;
- the second primary signal "Rin2" comprising the synchronization information DE, VS and HD;
- the third and fourth primary signal "Rin0" and "Rin1" comprising only the colour encoding information.

In the case of FIG. 3, the bits corresponding to the encoding of the colour signals are marked Ri, Gi and Bi, i varying from 0 to 5. If the video signal is encoded on 8 bits, a fifth primary signal supports the additional, least significant colour information.

Figure 4:
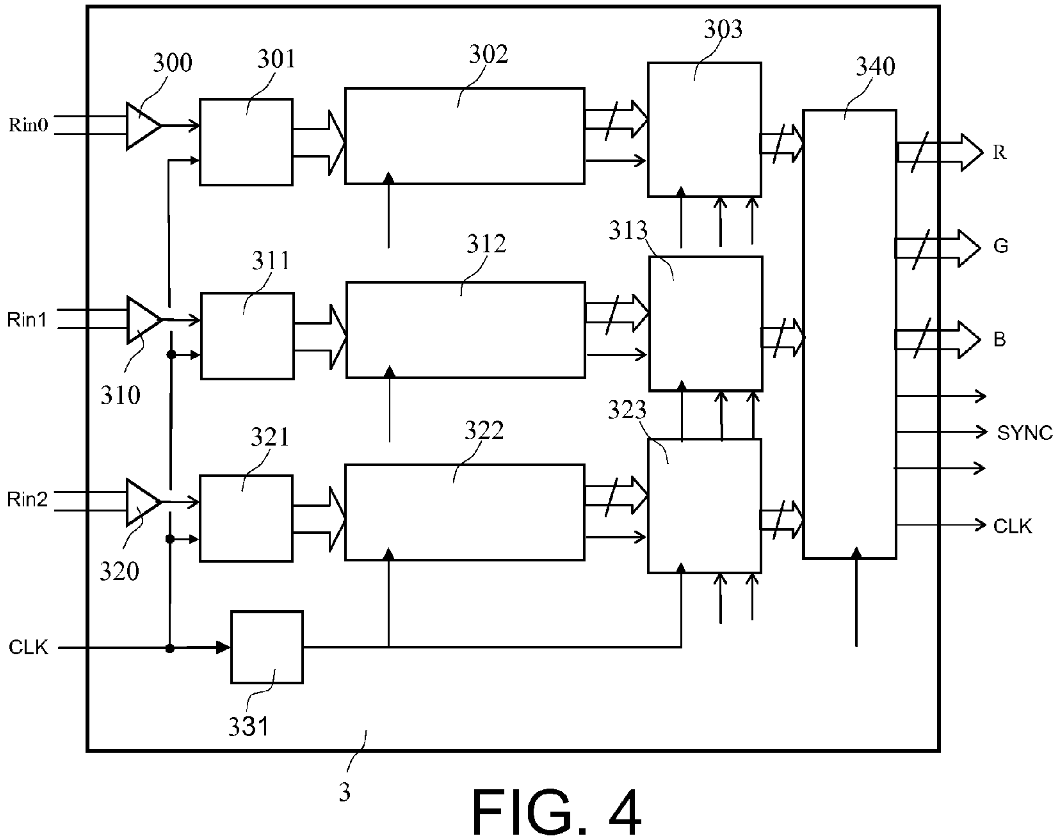
FIG. 4 represents the general block diagram of the receive module according to the invention.

FIG. 4 represents the general block diagram of the receive module according to the invention in the situation in which the video signal is encoded on 6 bits. The "LVDS" link therefore comprises 4 primary signals marked Rin0, Rin1, Rin2 and CLK. The 3 signals Rin0, Rin1 and Rin2 pass through three substantially identical electronic chains. Each chain essentially comprises an amplification stage (modules 300, 310 and 320), a deserialization stage (modules 301, 311 and 321), a stage of retrieving the phase of the elementary "bits" (modules 302, 312 and 322) and a stage of retrieving the phase of the elementary pixels (modules 303, 313 and 323). The assembly of the three chains feeds a final electronic module 340 for storing and reformatting the decoded signals, which supplies at the output the R, G, B signals, the synchronization signals and the clock signal of the initial video signal.

For the purposes of clarity, all that follows relates to a signal encoded on 6 bits transmitted over an "LVDS" link comprising 4 transmission lines but can easily be transposed to a signal encoded on 8 bits transmitted over an "LVDS" link comprising 5 transmission lines.

As has been said, the various signals of the "LVDS" link can be skewed relative to one another. It is therefore essential to retrieve the phase of the elementary bits comprising the various so-called "bit" phase signals on each channel independently.

A conventional clock retrieval circuit based on an analogue phase loop cannot be used because the video data are not encoded. The duration without transition, also called "run length", is not limited, the worst case corresponding to a "black" image. In this extreme case, the channels Rin0 and Rin1 have no activity. Therefore, it is possible to envisage images such that the "run length" on the channels Rin0 and Rin1 is roughly equal to the image period, i.e. 16.7 ms for example, in the case of an image refresh frequency of 60 images per second.

To solve this problem, the receive means operate on oversampling of the input channels at a frequency markedly higher than the clock frequency of the video signal. This principle is applied, either for low-speed transmissions, or for particular applications, such as receipt of "SDI" signals meaning "Serial Digital Interface" signals with a programmable logic circuit of the "FPGA" type.

It is possible to use a sampling frequency equal to 5 times the clock frequency. The choice of the ratio 5 is practical because it gives an ideal central sampling position and two adjacent positions that are acceptable for tolerance of the high-frequency "jitter". But other options are possible.

Figure 5:
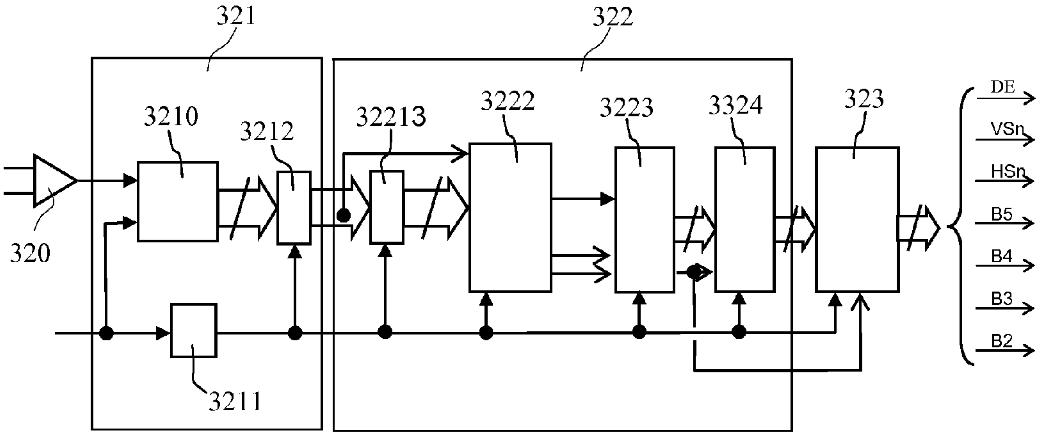
FIG. 5 represents the general block diagram of one of the oversampling circuits of the input channels of the receive module according to the invention, necessary for retrieving the "bit" signal.

As an example, FIG. 5 shows the functional block diagram of the receive channel Rin2 which comprises the synchronization signals DE, VS and HS. This device essentially comprises two modules 321 and 322. A first module 321 performs the function of deserializer of the Rin2 signal which is a serial signal and the second module 322 recognizes the bit phase. More precisely, these electronic subassemblies of the Rin2 receive channel comprise:

- a shift register 3210 making it possible to oversample the stream of 7-bit words originating from the Rin2 channel at a frequency of 5 times higher than the clock frequency and to transmit streams comprising 20 samples;
- a first and a second identical storage register 3212 and 3221;
- indexing and comparison means 3222 comprising an electronic pointer P which is normally indexed on the central sample of these 5 samples. The indexing and comparison means 3222 also comprise means for detecting the state transitions of these samples. In order to perform this function, it is possible to use a logic gate array performing the "exclusive OR" function, also called XOR. It is known that the output of an XOR gate is at logic level 1 only if one and only one of these two inputs is at logic level 1. By this means, it is easy to determine the state transitions which will result, at the output of the XOR gates, in logic levels "1";
- a third storage register 3223 on 11 bits;
- a fourth storage register 3224 on 7 bits;
- conventional parallel signal processing functions 323 comprising conventional means for detecting the various signals in series forming the initial Rin2 signal. At the output of this circuit, the various components of the Rin2 signal, including the three synchronization components DE, VSn and HSn, are retrieved on 7 parallel channels. The extraction of the 7 components takes place at the speed of the pixel frequency at mean value.

In the usual applications of the "SDI" reception type of this deserialization method, there are 3, 4 or 5 bits to be sampled depending on the frequency shift between the frequency of the source and the sampling clock. Also, the 11-bit register must be managed in a slightly particular manner. Depending on the direction of arrival of the data, the passage of change of position of the pointer may require a sampling of 5 data so as not to lose one of them or may allow only 3 samples in order not to duplicate one of them.

The detection of the phase of the transitions is carried out simply by identification of the output of the logic gates performing the "exclusive OR" logic function on 2 adjacent bits, a 1 state indicating a transition. The sampling of the data is carried out with 4 multiplexer components, called 5-to-1 "MUX", plus a fixed position for the fifth sample. Depending on the information of the pointer, 3, 4 or 5 samples are transferred. The next register is filled gradually as the samples arrive and has 11 bits, 4 samples being able to be carried over when the first 7 are extracted.

The capacity to operate correctly for a "run-length" duration, that is to say the maximum duration of one and the same "0" or "1" state, of such a device in its usual use depends on the frequency difference between the source and the sampling. Because of the frequency shift, a sufficiently frequent catching-up of the sampling phase is necessary, but this catching-up can be caused only by the presence of a transition. Therefore the maximum authorized "run-length" is all the greater if the frequency shift is small. In our application, with a "mesochronous" sampling of the source, the "run-length" is therefore infinite, the device being capable of deserializing an uncoded signal.

Figure 6:
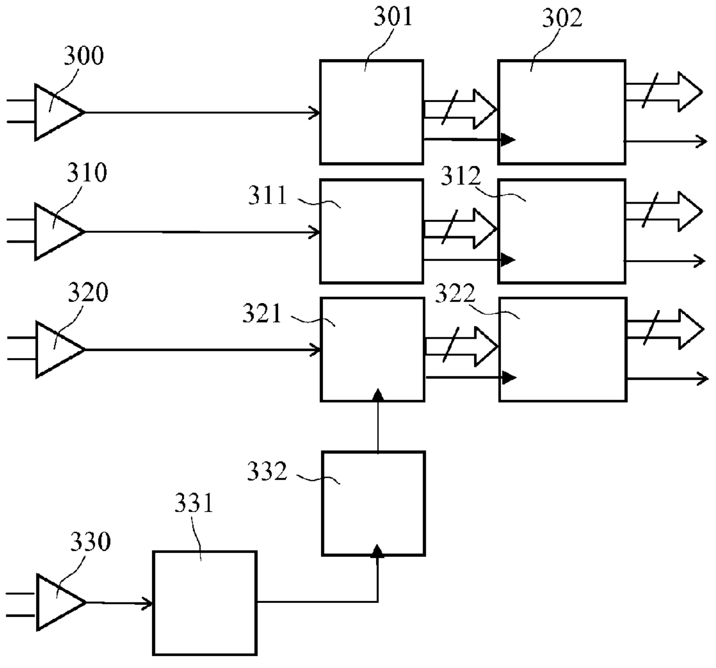
FIG. 6 represents the general block diagram of the oversampling circuits of the input channels and of the circuit producing the sampling clock of the receive module according to the invention.

As indicated in FIG. 6, the sampling clock is manufactured using phase locked loops 331 or "PLL", which can provide a skew on the clock. It is known that, in the worst case, the "run-length" may be extremely long, the device then becoming sensitive to jitter, both high-frequency jitter and low-frequency jitter, known as "wander". It is demonstrated that there is none of this provided that the phase locked loops are correctly programmed.

The other channels Rin0 and Rin1 have the same set-up for the electronic portion concerning the retrieval of the bit phase.

The electronic implementation of the deserialization and retrieval of the elementary "bits" phase stages does not pose particular problems. As an example, with a maximum transmission frequency of the pixels equal to 85 MHz, each pixel comprising 7 bits and each bit being sampled on 5 samples, the logic circuits carrying out the oversampling must operate at a frequency of 2975 MHz or 2.975 Gbaud. The "ARRIA GX" or "STRATIX" brand FPGA circuit from the company ALTERA that can be used up to 3 Gbaud on its serial inputs is perfectly suited to performing this function.

As has been said, it is also necessary to retrieve the "pixel" phase on the three receive channels. The words at the output of the 7-bit registers of the phase-recognition modules may comprise data belonging to two adjacent pixels. Use is then made, on each channel, of a device for retrieving the frontier of the parallel word also called the "word aligner using a barrel shifter", a "barrel shifter" designating a "barrel" register. The latter consists of parallel registers and of 7 7-to-1 multiplexers. To find the correct multiplexing to carry out, it is necessary to be capable of recognizing a particular message in the transmitted signal.

Figure 7:
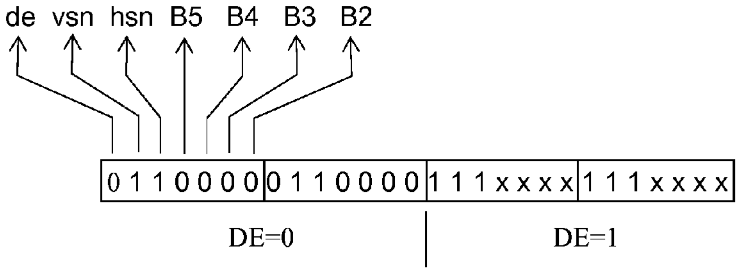
FIG. 7 represents an example of the variation of the values of the line signal "Rin2" and of the detection of characteristic sequences in this signal.

As has been shown in FIG. 3, the Rin2 channel possesses the synchronization information, that is to say the DE, VS and HS information. As can be seen in FIG. 7, which represents the succession of the 7-bit words on the Rin2 channel, outside the active video zone, DE is equal to 0 and the video RGB bits, that is to say B5, B4, B3 and B2. The 10-bit sequence marked "0110000111", and of which the "0" placed in the first position and the "1" placed in the eighth position correspond to the change of the value of DE, is therefore characteristic of this transition at the beginning of each active line and cannot be found at another time. For the 7 possible phases in receive mode, it is therefore sufficient to run the test of this sequence also called "word boundaries pattern". When it appears, the phase is identified and the multiplexer of the "barrel shifter" is then positioned so that the output words begin with DE.

FIG. 3 allows it to be understood that, unfortunately, with respect to the Rin0 and Rin1 channels, and the additional channel in the case of an RGB signal encoded on 24 bits, there is no possibility of finding a similar item of phase information. Also, it is necessary that, jointly with the resources applied in the receive module, the device according to the invention be associated with a resource included in the transmitter. This associated resource may be of the hardware or software type.

A hardware solution is obvious. It is sufficient to modulate in a certain manner the bits of the Rin1 and Rin0 channels during the image transition phase or "blanking" when the value of DE is at "0". Unfortunately, this solution is difficult to carry out because the transmitter equipment is, in virtually all cases, a component called "COTS" meaning "Component Off The Shelf" such as a hardened component for a microcomputer of the "PC" type which is difficult to modify in terms of hardware. The "LVDS" output is most frequently that of a graphic chip that does not allow the necessary modification.

Consequently, the associated resource must be able to be produced by software, and it may consist only in modifying the content of the video signal in the simplest and least disruptive way possible.

A first embodiment consists in carrying out a small tattooing operation on the image, an operation known as "watermarking" housed in a corner of the image, at the top left for example. The tattoo is of low intensity using the least significant bits or "LSB" of the pixels of the image. It is possible, for example, to use the colour bits G0 and B0. This tattoo is not visually perceptible because of its location and its low visual impact. But this type of function is not a priori easy to carry out with an application software programme in the case of an item of equipment based on a card for a microcomputer of the PC type.

A second embodiment consists in introducing a recognition graphic pattern of the "post-it" type. In this case, the graphic pattern must be superimposed on the image at any application executed by the transmitting equipment. This means that it is necessary to generate a "patch" of image that always replaces the original video image. The method making it possible to generate this pattern is similar to that of the small software program called a "post-it" having the "always on top" parameter enabled. In our application, the major difference compared with the "post-it" software program is that the location of this image fraction must be absolutely fixed and impossible to move. The height of the pattern may be only one line, preferably at the left on the top line of the screen.

The synchronization of the Rin1 and Rin0 channels is based on the recognition of this graphic pattern. Naturally the detection is validated in a time window relative to the synchronization information that has been extracted from the Rin2 channel. This prevents the risk of an unwanted detection associated with a particular image content in which the graphic pattern is found by chance.

The recognition pattern must fulfil the following two conditions:

- the pattern must not be recreated simply by shifting pixels, that is to say it must not comprise periodicities, in other words, the pattern must have a strong autocorrelation;
- the pattern must comprise sufficient pixels for the probability of confusion with another image portion to be very slight. In order to make detection more secure, the presence of the pattern is validated in a time window of determined duration. If the accepted skew is of several pixels, the window must be of a duration that is sufficiently longer than the pattern, and in this case it is preferable to work with a fairly long pattern.

The pattern consists of a certain number of 7-bit words. If the pattern comprises a large number of words, the pattern may be detectable by the recognition of a single bit per word. In this case, it becomes possible to detect only the particular sequence associated with a given bit. This simplifies the quantity of registers necessary and the size of the combinatory logic if the pattern is very long, because in this case the quantity of bits is overabundant.

Figure 8:
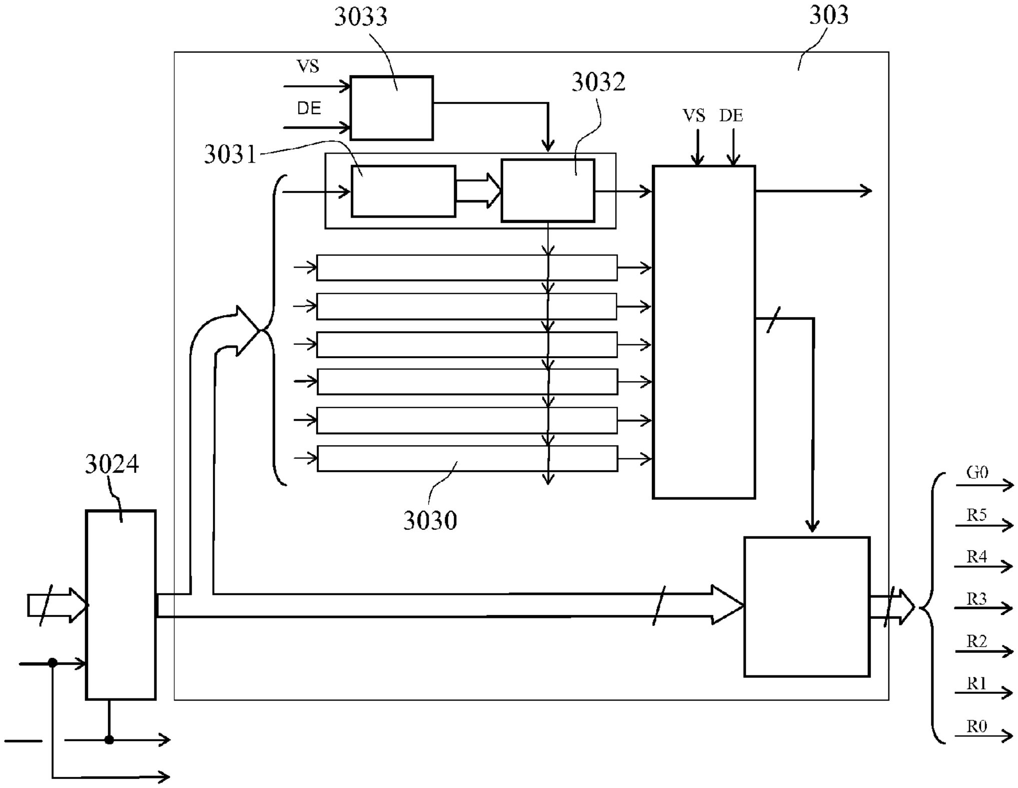
FIG. 8 represents the general block diagram of one of the identification circuits of the graphic pattern according to the invention, necessary for retrieving the "pixel" signal.

FIG. 8 gives an exemplary embodiment of a stage for retrieving the phase of the elementary pixels based on the identification of the recognition pattern. This stage corresponds to that put in place on the Rin0 channel. Naturally, the amplification stage is identical on the Rin1 channel. One of the functions of this stage is to find on each of the bits the sought sequence or "pattern" which corresponds to a given bit by means of a set of recognition modules 3030 each comprising a shift register 3031 and a pattern detection module 3032. As has been said, the detection is carried out only in a time window controlled by the module 3033. In this embodiment, for a fairly long pattern, since the phase tolerance can be more than one pixel, it is necessary to add several 7-bit registers in the "barrel shifter" function in order to move the phase of the word forward or backward relative to the DE signal originating from the Rin2 channel. This change of phase is controlled by the time elapsing between the DE signal and the detection of the pattern.

For a shorter pattern, it is possible to use a more usual set-up, such as that used for the byte alignment of a serial signal, also called "byte boundaries alignment".

The visual effect of the recognition pattern is very limited because it is restricted to the top line of the image. If the user is aware of its presence, it is not necessarily appropriate to try to convert the pattern into noise by means of a pseudo-random code conversion also called "scrambling" for example. On the other hand, it may be desirable that the pattern be clearly recognizable without ambiguity, therefore be of a certain length. It is even possible to use patterns extending over several lines.

It is very desirable that the receiver be capable of operating even with a source that has not added the appropriate pattern. This may for example allow the use of the receiver on standard means with a short cable. Also, when the message is not regularly found on any of the bits of the Rin0 and Rin1 channels, it is possible, after confirmation, to conclude that the source is not transmitting it. In this case, the receive interface is automatically configured in a mode similar to that of an ordinary "LVDS" receiver, with a tolerance to the "skew" that is ordinary and less than the bit period. In this "patternless" mode, the Rin0 and Rin1 channels are directly phase controlled on the Rin2 channel on the assumption that the skew is less than a bit period. It is sufficient for this to position the "barrel shifter" modules of the Rin0 and Rin1 channels with reference to the Rin2 channel. In this mode, the deserialization blocks marked "SERDES" and the "BitSampler" modules must be scrupulously initialized in an identical manner. It should be noted that the phase of the clock channel Clk is of absolutely no importance, it is only the skew between the Rin channels that counts. Therefore, relative to the normal "LVDS" circuits, in the "without superimposed pattern" mode, phase errors, that may result from the structural difference between the transmission of the clock and the transmission of the channels, are avoided. In transmission as in reception, the Rin channels are processed in the same manner, so the skews associated with integrated circuits are minimized.

The advantages of the transmission system according to the invention are as follows:

with a receiver furnished with the device forming the invention, the "LVDS" transmission over several pairs of lines is insensitive to the "interpair skew";

tolerance with respect to "skew" makes it possible to add equalization circuits in order to compensate for the high-frequency losses of the cable, which allows transmission over greater lengths;

the receiver remains compatible with a source with no added pattern, with standard performance.

The drawbacks of the device are moderate. It essentially involves:

using electronic circuits capable of operating at a frequency 5 times greater than the transmission rate in order to oversample the signals.

It has been seen that the use of such components poses no particular problems;

adding a superimposed pattern to the source image, this pattern having a slight impact both from the point of view of its implementation and its visual appearance.

The invention claimed is:

1. A system for transmitting and receiving signals of video digital images of the "RGB" type for links of the "LVDS" type, comprising:

at least one transmit module, a transmission link and a receive module;

the "RGB" video signal comprising three colour signals corresponding to the colour coding of the pixels of the transmitted images, three synchronization signals and one clock signal;

the "LVDS" video signal transmitted via the transmission link comprising at least four primary signals, each primary signal being transmitted over a transmission cable which is dedicated thereto, the first "LVDS" primary signal dedicated to the clock signal, the second "LVDS" primary signal comprising the synchronization information and at least the third and the fourth "LVDS" primary signal comprising only the colour coding information;

the "LVDS" transmit module having the function of encoding the "RGB" video signal into an "LVDS" video signal and the receive module having the function of decoding the "line" signal into an "RGB" signal;

wherein the transmission system comprises a means making it possible to inlay a graphic recognition pattern in the "RGB" video signal;

wherein the receive means operate in oversampling, that is to say at a sampling frequency that is a whole multiple of the frequency of the clock signal; and wherein the receive means comprise test means capable of identifying the synchronization information in the second "LVDS" primary signal and the graphic recognition pattern.

2. A system for transmitting and receiving signals of video digital images according to claim 1, wherein, when the colour signals are encoded on 6 bits, the transmission link comprises 4 transmission cables and in that, when the colour signals are encoded on 8 bits, the transmission link comprises 5 transmission cables.

3. A system for transmitting and receiving signals of video digital images according to claim 1, wherein the graphic pattern is of the "post-it" type, which corresponds to a portion of image, and is always situated in the same location of the video image and is always superimposed on the initial portion of video image that it replaces.

4. A system for transmitting and receiving signals of video digital images according to claim 3, wherein the graphic pattern has a height limited to one line.

5. A system for transmitting and receiving signals of video digital images according to claim 3, wherein the graphic pattern is aperiodic.

6. A system for transmitting and receiving signals of video digital images according to claim 1, wherein the sampling frequency is equal to 5 times the frequency of the clock signal.

* * * * *